(12) United States Patent
Zhang et al.

(10) Patent No.: US 8,157,737 B2
(45) Date of Patent: Apr. 17, 2012

(54) METHOD AND APPARATUS FOR REAL TIME SPATIAL COMPOUND IMAGING

(75) Inventors: Yu Zhang, Shenzhen (CN); Yong Wang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1251 days.

(21) Appl. No.: 11/854,656

(22) Filed: Sep. 13, 2007

(65) Prior Publication Data

US 2008/0146931 A1  Jun. 19, 2008

(30) Foreign Application Priority Data

Dec. 15, 2006  (CN) .......................... 2006 1 0169014

(51) Int. Cl.
*A61B 8/00* (2006.01)

(52) U.S. Cl. ........................................ 600/443; 600/437

(58) Field of Classification Search .................. 600/437, 600/447, 443
See application file for complete search history.

(56) References Cited

U.S. PATENT DOCUMENTS

| | | | |
|---|---|---|---|
| 6,126,598 A * | 10/2000 | Entrekin et al. ............... | 600/437 |
| 6,126,599 A | 10/2000 | Jago et al. | |
| 6,135,956 A | 10/2000 | Schmiesing et al. | |
| 6,224,552 B1 * | 5/2001 | Jago et al. ....................... | 600/437 |
| 6,390,981 B1 * | 5/2002 | Jago ............................... | 600/443 |
| 6,517,486 B1 | 2/2003 | Li | |
| 6,554,770 B1 * | 4/2003 | Sumanaweera et al. ....... | 600/443 |
| 6,858,010 B2 * | 2/2005 | Guracar et al. ................ | 600/443 |
| 7,780,601 B2 * | 8/2010 | Guracar et al. ................ | 600/447 |
| 2004/0054285 A1 | 3/2004 | Freiburger et al. | |
| 2005/0101865 A1 | 5/2005 | Hao et al. | |
| 2005/0113696 A1 | 5/2005 | Miller | |
| 2005/0124895 A1 | 6/2005 | Jensen et al. | |
| 2006/0030076 A1 | 2/2006 | Kobayashi et al. | |

FOREIGN PATENT DOCUMENTS

| | | |
|---|---|---|
| CN | 1650190 | 8/2005 |
| CN | 1849529 | 10/2006 |
| CN | 1883397 | 12/2006 |

OTHER PUBLICATIONS

Li Rui et al., "Application of real—time spatial compound imaging (sonoCT) in fetal echocardiography," J Ultrasound in Clin Med, Jul. 2006, vol. 8, No. 7, pp. 385-387.

Jin Shuwu et al., "Development of speckle processing technology," Chinese Journal of Medical Imaging Technology, Apr. 1990, pp. 2-3 (English abstract included).

* cited by examiner

*Primary Examiner* — Brian Casler
*Assistant Examiner* — Amanda Lauritzen
(74) *Attorney, Agent, or Firm* — Kory D. Christensen; Stoel Rives LLP

(57) ABSTRACT

The present invention provides a method and device for spatial compound imaging. The method comprises steps of receiving a component image $C(i, j)$, where i denotes a steering scan cycle, and j a steering angle of the component image; computing a differential image by subtracting a component image $C(i-1,j)$ from the component image $C(i, j)$ with the same steering angle from a previous steering scan cycle; pre-processing said differential image; compounding the pre-processed differential image and a previous compounded image to form a new compounded image.

24 Claims, 10 Drawing Sheets

METHOD AND APPARATUS FOR REAL TIME SPATIAL COMPOUND IMAGING

FIELD OF THE INVENTION

The present invention relates to an ultrasonic imaging system and, in particular, to an ultrasonic imaging system using the spatial compounding technique.

BACKGROUND OF THE INVENTION

In ultrasonic diagnostic imaging system, spatial compounding technique is often used to reduce speckle noise, acoustic shadow and reverberation of the ultrasonic image and improve contrast and signal-to-noise ratio. As a result, the definition and readability of the ultrasonic images are improved. The spatial compound imaging technique typically images an object from multiple angles by steering scan beams. FIG. 1 shows a view of spatial compounding by using a component image $C(i, j)$ of a linear array probe at three steering angles, wherein $C(i, j)$ denotes the jth component image during the ith steering scan cycle (time taken to image an object three times at three steering angles is defined as a steering scanning cycle). It can be seen that the component images at the three steering angles overlap in a trapezoid area of the whole scan region. Each component image at a different steering angle shows different speckle noise and acoustic shadow and reverberation. Therefore the effect of these disturbances can be efficiently reduced by compounding the three component images, thereby achieve a better image quality in the overlapping area.

FIG. 2 is a block diagram of a typical ultrasonic imaging system, which realizes a B-mode spatial compound imaging system. A compound imaging controller in FIG. 2 determines the steering angle for scanning the object and the number of component images, and controls the steering scan by controlling the transmitting beamformer and receiving beamformer. The received signal is dynamically filtered to extract valid frequency components of the echoes. The signal-to-noise ratio of the echoes is improved and then the envelope information of the echoes is extracted. Envelope extraction followed by log-compression and down-sampling etc. is applied to produce component images at different steering angles. The newly acquired component images and the component images previously stored in the memory are subjected to an image compounding process to produce a compounded image, which is fed to a monitor for display after digital scan conversion (DSC). It is apparent that the system can perform log compression on the compounded image after image compounding process. However, the stored component images will require a relatively large storage bandwidth to prevent the images from distortion because the B-mode images have a large dynamic range if the images are log compressed after the image compounding process. On the contrary, the storage requirement can be efficiently reduced if the images are log compressed before compounding the images.

A simple real time spatial image compounding method and device is proposed in the U.S. Pat. No. 6,126,599 by James R. Jago et al. In accordance with this method, an ultrasonic imaging system acquires and stores a plurality of component images at different steering angles; the acquired component images are compounded to generate a first compounded image; one of the component images is subtracted from the first compounded image to generate a partially compounded image; thereafter when a new component image at a new steering angle is obtained, the partially compounded image is added to the new component image to form a second compounded image. That is, this method implements real-time spatial compounding by subtracting a previously acquired component image at a steering angle from a previously compounded image and then adding to a newly acquired component image at the same steering angle to obtain a new compounded image. The advantage of the method lies in that it does not need to access all the component images in the memory each time the compounding is performed, as a result the bandwidth required for memory access is reduced.

Although the above discussed patent can display image at a real-time frame rate, however, there exist the following problems: (1) the first compounded image Co(0,2) is generated only after all the component images Co(0,0), Co(0,1), Co(0,2) at all the steering angles have been acquired, as shown in FIG. 3; (2) it has to pre-generate and store a partially compounded image, which usually requires a large bit-width for storing; (3) there is no way to detect and reduce the motion blur inside the compounding loop.

SUMMARY OF THE INVENTION

To overcome the above-identified problems, the present invention proposes a new spatial compounding method and device.

Furthermore, since a user need constantly move a probe to locate a scan target during the scanning phase. Motion blur will degrade the compounded image due to the low time resolution from a steering scan cycle. To tackle this problem, the present invention proposes an ultrasonic imaging system and method which can automatically detect and reduce the motion blur inside the spatial compounding loop.

In one aspect of the present invention, there is provided a method for compounding component images at different steering angles, comprising, a) receiving a component image $C(i, j)$, where i denotes a steering scan cycle and j a steering angle of the component image; b) obtaining a differential image by subtracting a component image $C(i-1,j)$ from the component image $C(i, j)$ with the same steering angle from a previous steering scan cycle; c) pre-processing said differential image; d) compounding the pre-processed differential image and a previously compounded image to form a new compounded image.

In another aspect of the present invention, there is provided a method for use in an ultrasonic scanning system, comprising: a) receiving a component image $C(i, j)$, where i denotes a steering scan cycle and j a steering angle of the component images; b) obtaining a differential image by subtracting a component image $C(i-1,j)$ from the component image $C(i, j)$ with the same steering angle from a previous steering scan cycle; c) determining if motion blur exists in the image based on an amplitude of said differential image, wherein an uncompounded image, e.g. a component image at a zero steering angle is stored and output for display if the amplitude of said differential image exceeds a first predetermined threshold Th1; otherwise said differential image is pre-processed if the amplitude of said differential image is less than a second predetermined threshold Th2, and then a new compounded image is formed by compounding the pre-processed differential image and a previous compounded image and output it for display.

DETAILED DESCRIPTION OF THE EMBODIMENTS

The present invention is now explained in detail with reference to preferred embodiments.

Example 1

Figure 1:
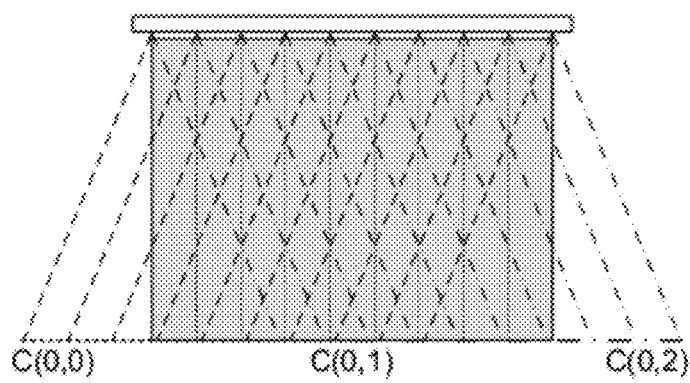
FIG. 1 is a schematic drawing of spatial compounding.
Figure 2:
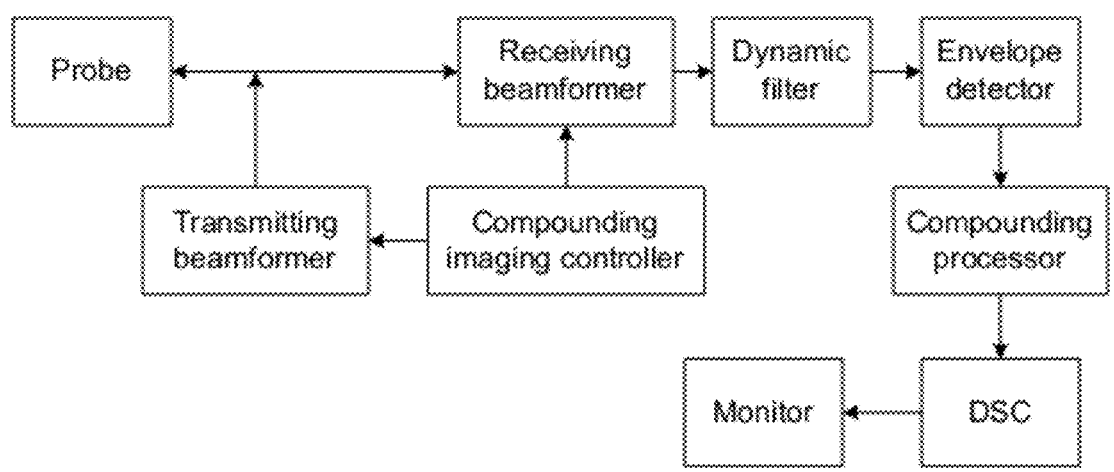
FIG. 2 is a block diagram of the ultrasonic imaging system of the prior art.
Figure 3:
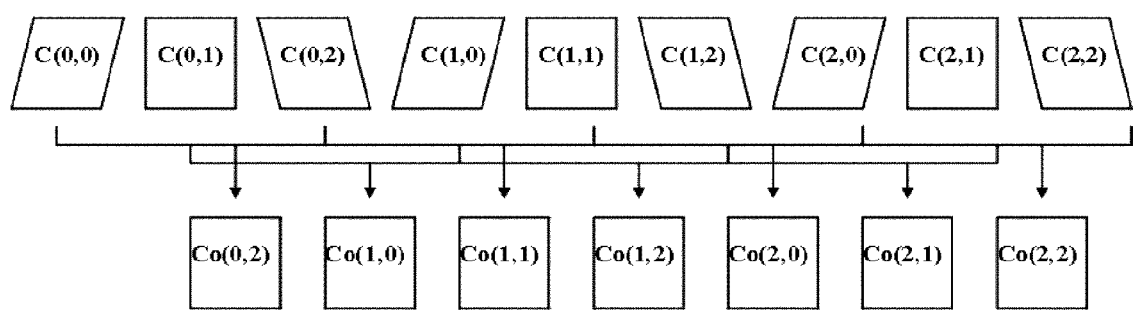
FIG. 3 is a schematic drawing of the real time image compounding of the prior art.
Figure 4:
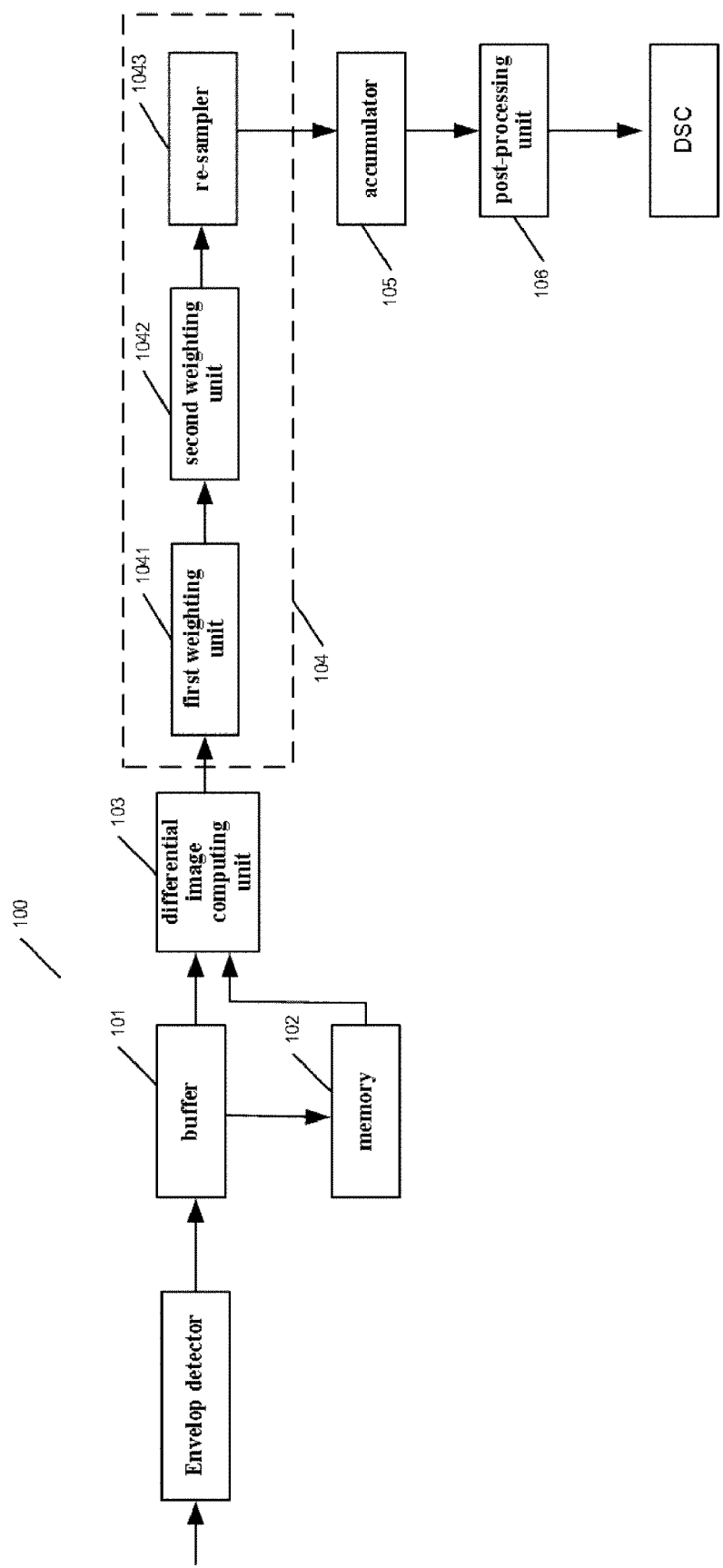
FIG. 4 is a block diagram of an ultrasonic imaging system in accordance with the first embodiment of the present invention.

FIG. 4 is a schematic configuration illustrating an image compounding device 100 for an ultrasonic imaging system in accordance with the present invention. The image compounding device 100 comprises a buffer 101, a memory 102, a differential image computing unit 103, a pre-processing unit 104, an accumulator 105 and a post-processing unit 106.

The buffer 101 receives a newly sampled component image $C(i, j)$ having a certain steering angle from an envelope detecting unit and has it buffered, where $C(i, j)$ denotes a component image at the jth steering angle acquired in the ith steering scan cycle. A steering scan cycle is defined as a period used to scan and image the target at a predetermined number of steering angles. The memory 102 includes a plurality of storage areas which are adapted for storing the received component images and the compounded images respectively. Each of the plurality of storage area is set to zero during initialization.

The differential image computing unit 103 reads out the newly sampled component image $C(i, j)$ from the buffer 101 and the component image $C(i-1, j)$ with the same steering angle from a previous steering scan cycle from the memory 102, and then performs subtraction on the two component images to obtain a differential image $D(i,j)=C(i,j)-C(i-1,j)$ and has this differential image temporarily stored, e.g. having it stored in the buffer 101. After the subtraction, the component image $C(i, j)$ in the buffer 101 is written into the memory at the address of the component image $C(i-1, j)$ and update it.

The resulted differential image is outputted to the pre-processing unit 104 for pre-processing. In this embodiment, the pre-processing unit 104 comprises: a first weighting unit 1041 for weighting the differential image $D(i, j)$ based on the size of the steering angle and the scan depth of the image in such a manner as, for example, applying a larger weighting coefficient to the near field of the component image at a larger steering angle and applying a larger weighting coefficient to the far field of the component image at a zero steering angle such that the spatially compounded image maintains a good image quality both in the near and far fields; a second weighting unit 1042 for weighting the scanlines of the differential image $D(i, j)$ in such a way that the scanlines closer to the boundary have smaller weighting coefficients, as a result the boundary effect due to compounding the component images at different steering angles is reduced; and re-sampling unit 1043 for re-sampling said differential image in a predefined coordinate system such that the re-sampled differential image and the spatially compounded image are located in the same coordinate system, wherein the re-sampling can be implemented with linear or non-linear interpolation known in the field of image processing. Image re-sampling is discussed in U.S. Pat. No. 6,135,956, by Daniel C. Schmiesing et al, which proposes a method for obtaining component images with the unified coordinate system by means of re-sample such that for a single target, component images at different steering angles are in the same coordinate system. Such a coordinate system typically is the same as the imaging coordinate system of the component image at a zero steering angle, or may be the displaying coordinate system of a monitor. In this example, the coordinate system is generally chosen to be the same as the component image at a zero steering angle in order to simplify the DSC module of the system.

The re-sampled differential image $D(i, j)$ is fed to the accumulator 105, where the differential image and a previous compounded image stored in the memory 102 are summed to form a new compounded image $Co(i, j)$. The generated compounded image frame $Co(i, j)$ is subsequently stored in the memory 2 and outputted to the image post-processing unit 106.

Figure 5:
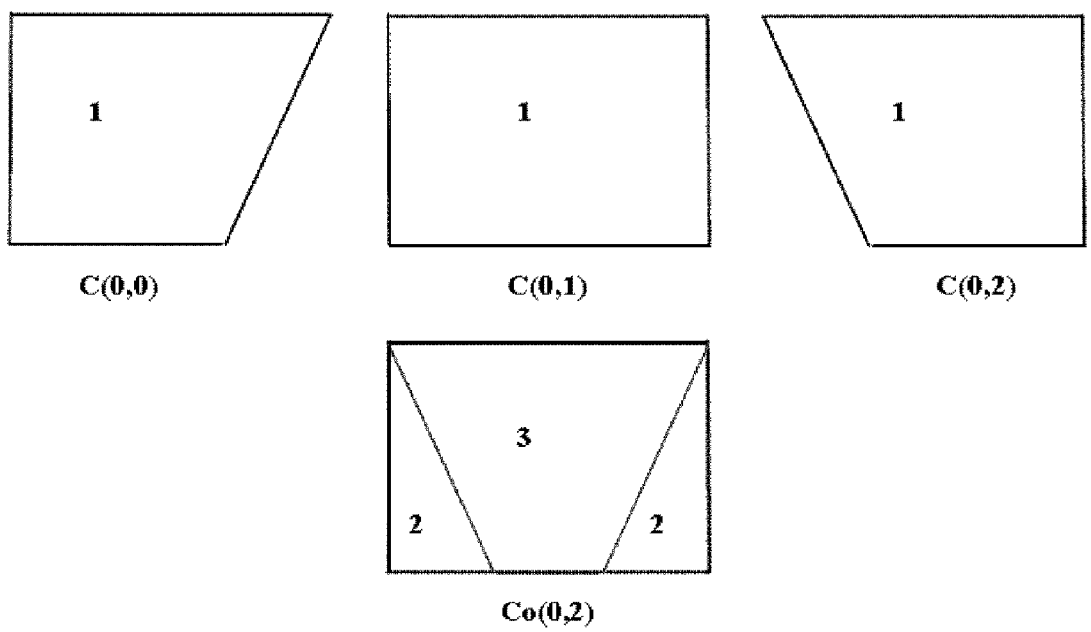
FIG. 5 is a schematic drawing illustrating image compounding.

Since summation is used in the compounding computation in the present invention, different regions of the compounded image have different brightness. FIG. 5 is a schematic drawing illustrating image compounding process. If the weighting coefficients of the three component image $C(i, j)$ ($j=0,1,2$) are all set to 1, the weighting coefficient of the generated compounded image is shown in $Co(0, 2)$ in FIG. 5. The display coordinate of the compounded image is the same as that of the component image $C(0, 1)$. The central trapezoid region of $C_0(0,2)$ is the superposition of three component images, and as a result, the weighting coefficient of this region is 3. The triangular regions on both sides of the central trapezoid region are the superposition of two component images, as a result the weighting coefficient of this region is 2. If the compounded image superposed in this way is directly displayed, then the brightness of the central trapezoid region is higher than that of the triangular regions on both sides. To overcome this defect, in this embodiment, the amplitudes of the brightness of the different regions of the compounded image are normalized by the post-processing unit 106 so as to improve the image quality. The normalization is realized by multiplying the weighting coefficients of each region by the reciprocal of the weighting coefficient of the corresponding region. That is, in the compounded image $Co(0, 2)$ of FIG. 5, the weighting coefficients of the central trapezoid region is multiplied by ⅓ and the weighting coefficients of the triangular regions on both sides are multiplied by ½. It is apparent that the normalization factor has to be set based on the steering angles, the number of the compounded component images, the weighting policy of pre-processing etc.

The normalized compounded image is digitally scan converted before being displayed on the monitor.

It is noted that the above-described embodiment is a preferred embodiment of the present invention and all the elements in this embodiment are not necessary. For example, in the pre-processing unit, re-sampling the differential image is necessary while the weighting of the differential image is preferred but not mandatory, since it is only for the purpose of improving the image quality. Also, the post-processing unit 106 can be omitted in such an application where image quality is not critical or other compounding method is used.

The image compounding process of the present invention is now described with reference to FIG. 6.

Figure 6:
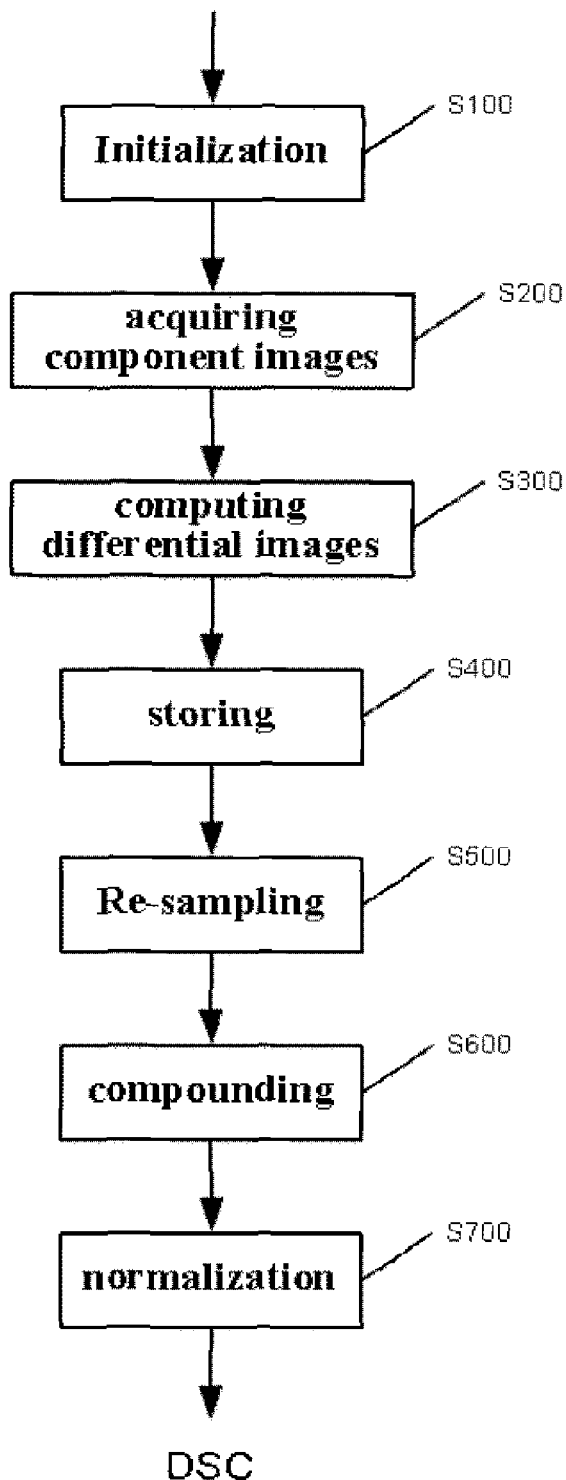
FIG. 6 is a flow chart of an image compounding method in accordance with the first embodiment of the present invention.

As shown in FIG. 6, firstly, the buffer 101 and memory 102 are initialized at step S100 to set the image values of all the component image storage and compounded component storage to zero, and set and store the first weighting coefficient, the second weighting coefficient, the re-sampling parameters to be used in the pre-processing unit 104 as well as normalization parameters to be used in the post-processing unit 106 in the memory 102.

At step S200, the system acquires a component image C(i, j) at a new steering angle and has it stored in the buffer 101. Then the processing proceeds to step S300.

At step S300, the differential image computing unit 103 reads out the component image C(i, j) in the buffer 101 and the component image C(i−1, j) with the same steering angle from a previous steering scan cycle stored in the memory 102 and performs subtraction on the two component images to obtain a differential image D(i, j). Next, at step S400, the resultant differential image D(i, j) is buffered and the component image C(i, j) in the buffer is written to the memory at the address of the component image C(i−1, j). Then the processing proceeds to step S500.

At step S500, the differential image D(i, j) is pre-processed, including weighting the differential image D(i, j) with a first set of weighting coefficients based on the steering angle and image scan depth of the component image, weighting the scanlines of the differential image D(i, j) with a second set of weighting coefficients in such a way that the scanlines closer to the boundary have smaller weighting coefficients. Then the weighted differential image is re-sampled such that the re-sampled differential image and the compounded image are in a same coordinate system.

At step S600, the accumulator 105 performs summation on the re-sampled differential image D(i, j) and a previous compounded image stored in the memory 102 to form a new compounded image and outputs it to the image post-processing unit 106. At step S700, the post-processing unit performs normalization on each region of the compounded image with the normalization coefficients stored in the memory 102 and stores the normalized compounded image in the memory 102. The normalized compounded image is then displayed via DSC.

Example 2

Figure 7:
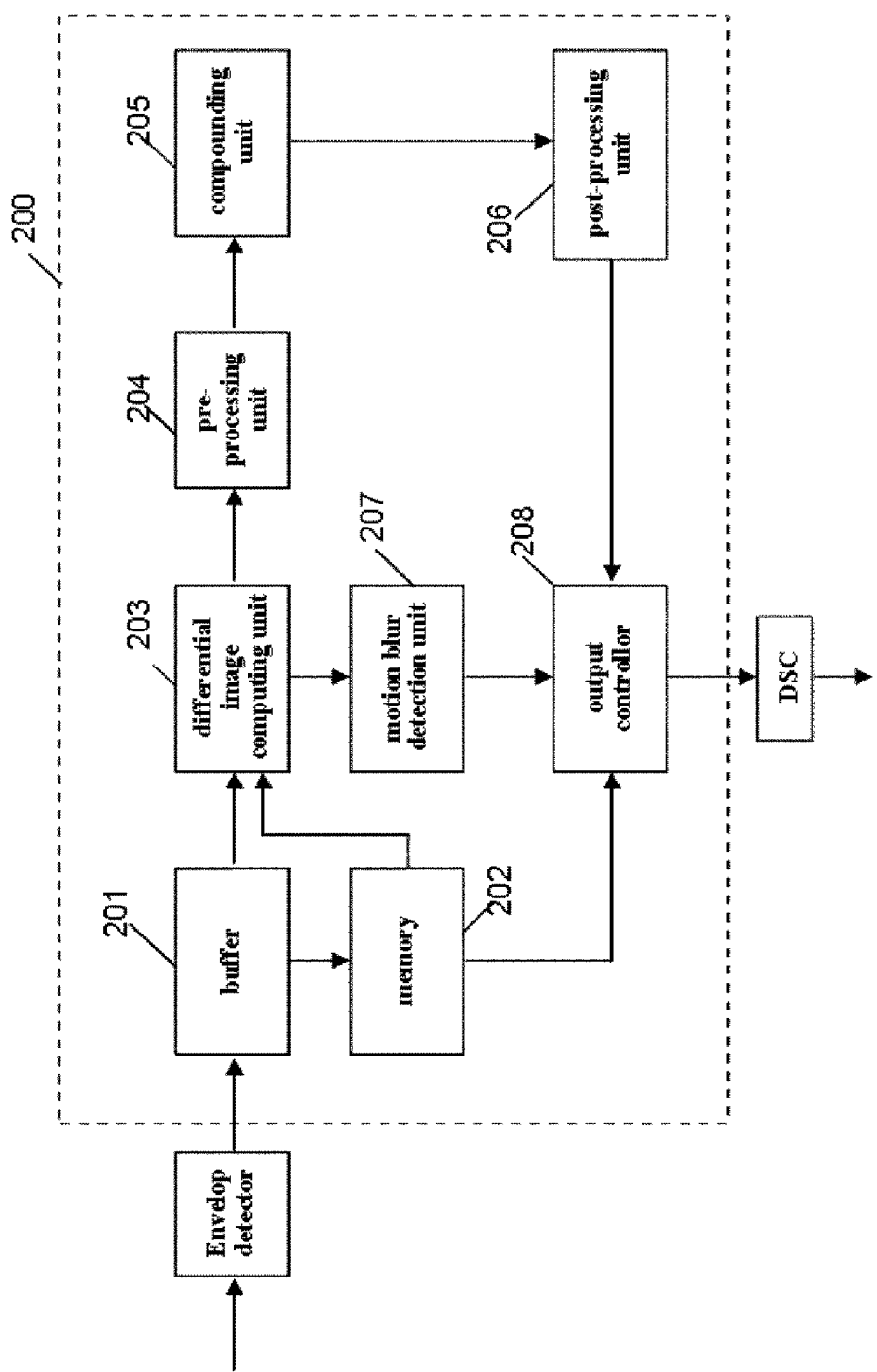
FIG. 7 is a block diagram of an ultrasonic imaging system in accordance with the second embodiment of the present invention.

FIG. 7 is an image compounding device 200 in accordance with the second embodiment of the present invention, which differs from the first embodiment in that a motion blur detection and control mechanism is introduced in this embodiment. Specifically, besides those elements of the first embodiment, the image compounding device 200 further comprises: motion blur detecting unit 207 for estimating the degree of the motion blur in the image based on the amplitude of the differential image at each steering angle; output control unit 208 for selectively controlling the image output to DSC for display based on the detection result of the motion blur detecting unit 207, wherein a component image stored in the memory 102 is outputted to DSC in case there exists a heavy motion blur and otherwise a compounded image is outputted to DSC.

The amplitude of the differential image can, for example, be presented by the summation of the absolute values of the differential image (SAD). If the value SAD is larger than a predetermined threshold Th1, then it indicates that the movement of the probe during the scan stage may cause a relatively heavy motion blur. When a motion blur occurs, if the compounded image is outputted, then it is inconvenient for users to locate a scanned target. Therefore, the output control unit 208 controls to output an original uncompounded component image to the DSC. To simplify the system design, the uncompounded component image is chosen to be the component image at the zero steering angle.

Once the location of the scan target is determined, the differences among the component images during different steering scan cycles are reduced and SAD is reduced correspondingly. When the value of SAD is less than a predetermined threshold Th2, the output controller 208 outputs a compounded image to DSC for display. Th2 can be equal to Th1; it can also be smaller than Th1 such that when SAD varies around Th1, the display image to be outputted does not switch between the uncompounded image and the compounded image frequently. If there is a large motion target in the imaging region, it is possible that the value of SAD is larger than Th1. In this case the system can constantly output uncompounded images, indicating that there is a heavy motion blur in the compounded image and thus the user needs to cancel spatial compounding. For example, during cardiac ultrasonic imaging, a higher imaging time resolution is required due to the fast movement of heart. Therefore, when the degraded time resolution of compound imaging can't meet certain application requirement, it is no longer appropriate to perform spatial compound imaging.

It is apparent that the amplitude of the above-described differential image can be represented by other factors except for SAD, for example the square sum of the differential image. Here SAD is used to represent the differential image due to the fact that the computational complexity of SAD is relatively low.

Figure 8:
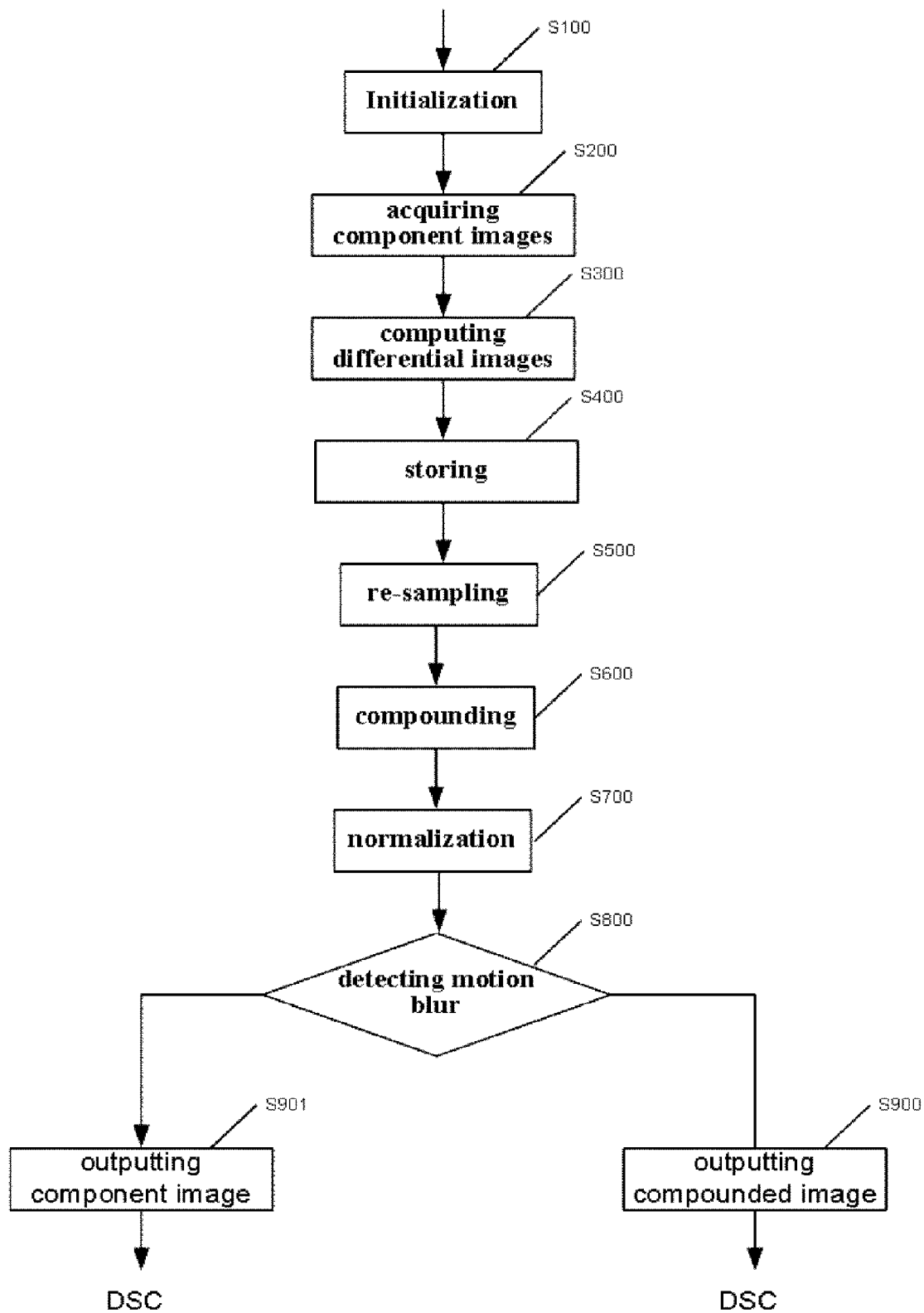
FIG. 8 is a flow chart of an image compounding method in accordance with the second embodiment of the present invention.

A flow chart of an image compounding process with blur control mechanism is shown in FIG. 8.

In the flow chart of FIG. 8, steps S100-S700 are the same as that of FIG. 6 of the first embodiment. Instead of directly outputting the compounded image to DSC, the motion blur detecting unit 207 determines if there is motion blur in the current scanned image at step S800 based on the amplitude of the differential image. If the amplitude is larger than a first predetermined threshold, it is determined that there is motion blur. Then the control unit 208 outputs the component image at a zero steering angle to DSC (S901). Otherwise, if the amplitude is less than a second threshold, it is determined that there is no motion blur and the current compounded image is outputted for display. Here the first threshold value is larger than or equal to the second threshold value.

It is noted that the above-discussed process steps are not exclusive. For example, a motion blur can be first detected after the differential image is computed at step S300. When there is a motion blur, the component image at a zero steering angle is directly outputted to DSC, then the component image is pre-processed, compounded and post-processed by the pre-processing unit 204, the compounding unit 205, the post-processing unit 206 respectively and the resultant compounded image is stored in the memory but not outputted, which will be used for the next compounding. Thereafter, a new component image at a new steering angle is acquired. In this way, the scanned image can be displayed in a quicker way without waiting for the compounding of image which might not be necessary for displaying due to motion blur.

Figure 9:
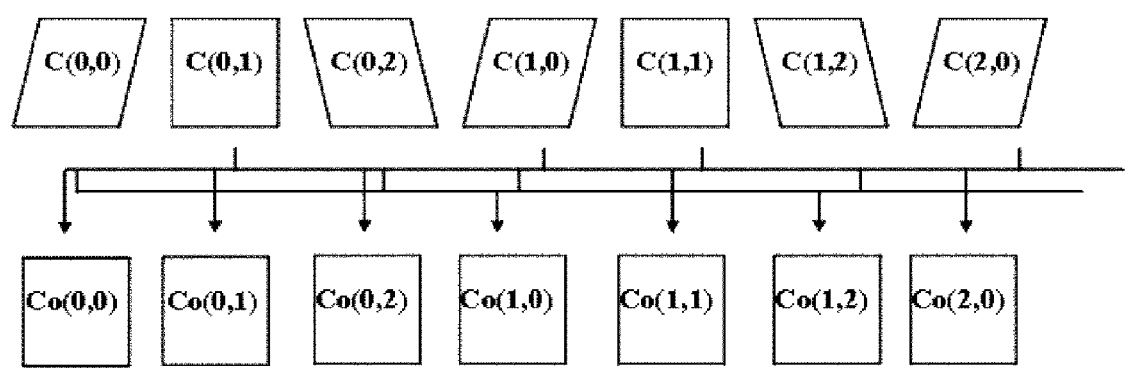
FIG. 9 is a real time image compounding in accordance with the present invention.

A real time image compounding in accordance with the present invention is illustrated in FIG. 9. It can be seen from FIG. 9 that the outputted compound images correspond to the component images one by one, i.e., in real time.

Figure 10:
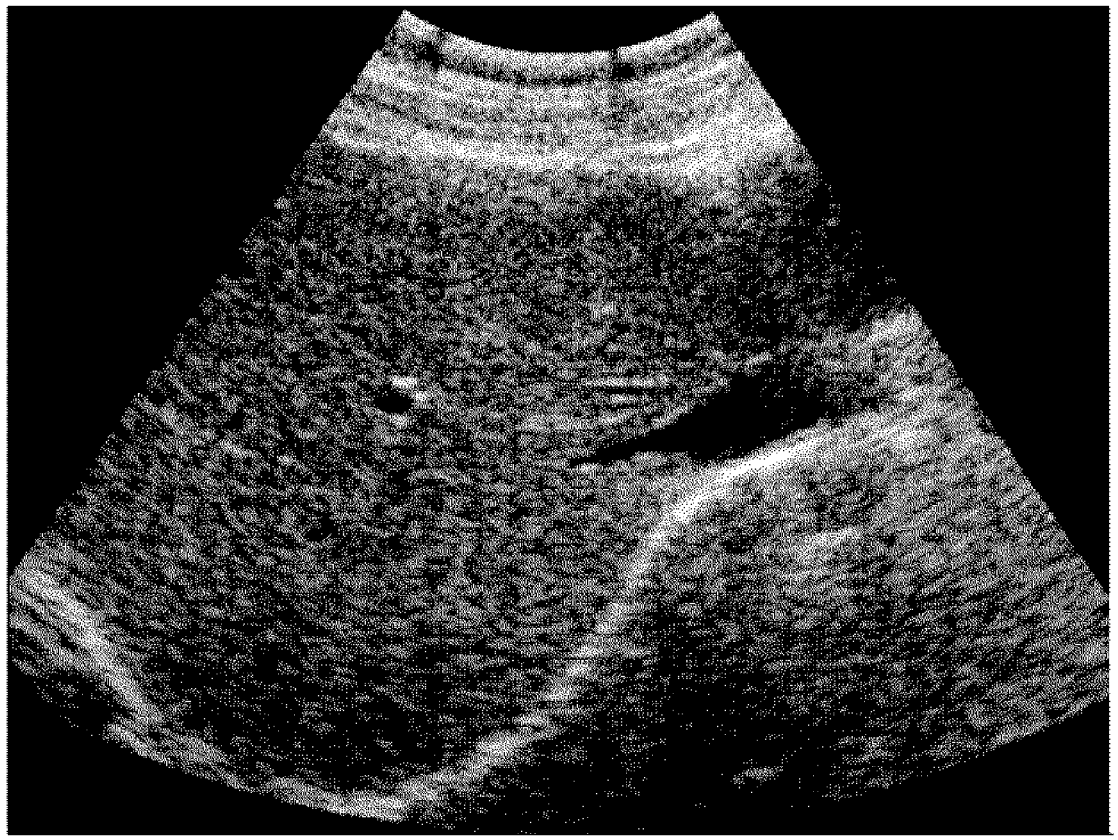
FIG. 10 shows an uncompounded ultrasonic image.
Figure 11:
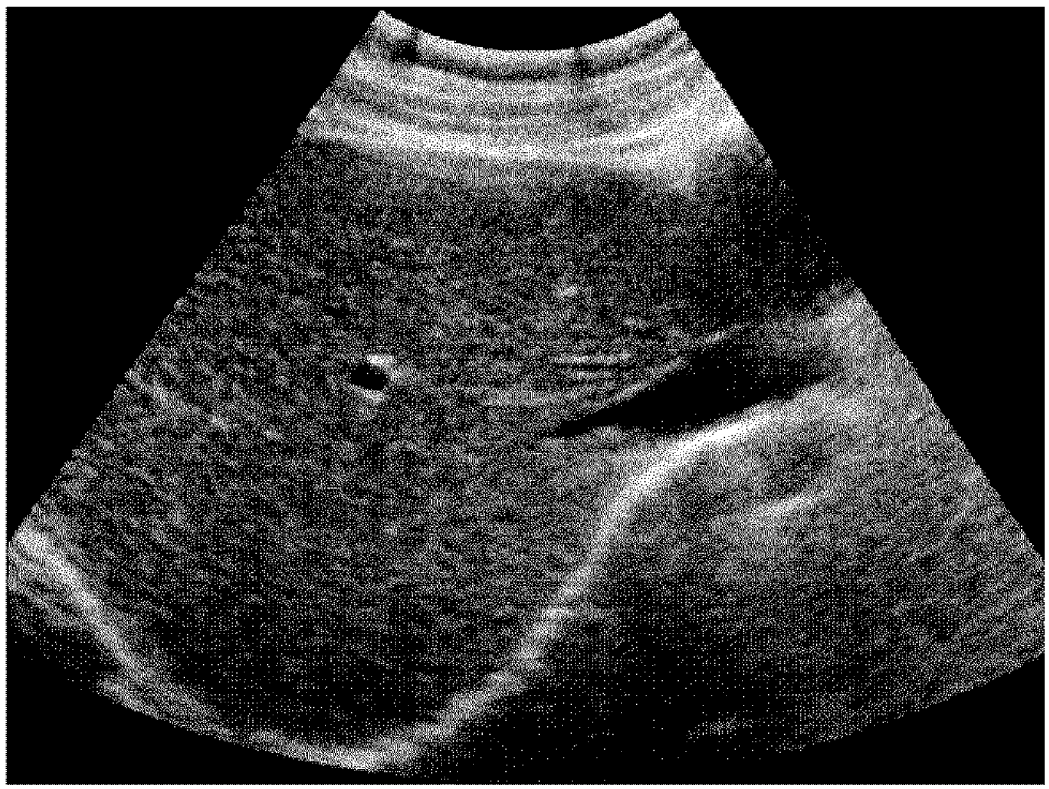
FIG. 11 shows an image compounded in accordance with the present invention.

The real time spatial compounding method of the present invention is tested with echoes from a real time steering scans at 5 angles, and the results are shown in FIGS. 10 and 11. FIG. 10 shows an image without spatial compounding, and FIG. 11 shows a compounded image. It can be seen that in the compounded image, the image speckles are efficiently reduced and the continuity of tissue interface is improved which proves the benefits of the spatial compound imaging method in accordance with the present invention.

The present invention can be implemented by either hardware or software. If the software implementation is selected, the system software can also be provided in various variants to implement different methods, such as the methods shown in FIGS. 6 and 8. These variants can include executing a computer program stored in a memory for implementing the method of the present invention with a central processing unit (CPU).

The specification describes the embodiments in detail by way of example with reference to the drawings such that those skilled in the art can understand the present invention. However, it is appreciated by those skilled in that art that the above-described examples are in no way limiting in implementing the concept of the present invention, therefore other embodiments can be deduced and deployed with changes and modifications to the structures and logics without departing from the spirit and scope of the present disclosure. The scope of the present invention is defined by the appended claims.

What is claimed:

1. A method for spatial compound imaging, comprising steps of:
    a) receiving a component image $C(i,j)$ of a current steering scan cycle i and a steering angle j, wherein a steering scan cycle comprises capturing a respective component image at each of a plurality of steering angles;
    b) using a processor to obtain a differential image $D(i,j)$ by subtracting a component image $C(i-1,j)$ of a previous scan cycle i-1 from the component image $C(i,j)$ of the current scan cycle i, wherein the component images $C(i,j)$ and $C(i-1,j)$ are of the same steering angle j;
    c) pre-processing said differential image $D(i,j)$;
    d) compounding the pre-processed differential image $D(i,j)$ of the current scan cycle i and a compounded image $Co(i-1,j)$ of a previous scan cycle i-1 to form a compounded image $Co(i,j)$ of the current scan cycle i; and
    e) storing the component image $C(i,j)$ for use in a subsequent scan cycle.

2. The method of claim 1, wherein pre-processing said differential image $D(i,j)$ comprises:
    re-sampling said differential image $D(i,j)$ such that the re-sampled differential image $D(i,j)$ and the compounded image $Co(i-1,j)$ are in a same coordinate system.

3. The method of claim 2, wherein the re-sampling comprises linear interpolation or non-linear interpolation.

4. The method of claim 3, wherein said coordinate system is the coordinate system in which a component image at a zero steering angle is located.

5. The method of claim 2, wherein the pre-processing step includes weighting scanlines of the differential image $D(i,j)$ such that the scanlines of the weighted differential image $D(i,j)$, which are closer to the boundary of the differential image $D(i,j)$, have smaller amplitudes.

6. The method of claim 5, wherein the pre-processing step comprises weighting the differential image $D(i,j)$ based on the steering angle j and a scan depth of the image.

7. The method of claim 6, further comprising normalizing the compounded image $Co(i,j)$ so as to eliminate an amplitude difference of different regions of the compounded image $Co(i,j)$ caused by the compounding.

8. The method of claim 7, wherein coefficients used in the normalization are a function of the steering angle j, a number of component images and weighting coefficients in the pre-processing.

9. The method of claim 1, further includes:
    computing a motion blur estimator in the differential image $D(i,j)$ according to an amplitude of the differential image $D(i,j)$;
    determining the motion blur is heavy and outputting an uncompounded component image for display if the amplitude of the differential image $D(i,j)$ is larger than a first threshold value;
    outputting the compounded image $Co(i,j)$ if the amplitude of the differential image is smaller than a second threshold value.

10. The method of claim 9, wherein the amplitude of the differential image $D(i,j)$ is a summation of absolute values of the differential image $D(i,j)$.

11. The method of claim 9, wherein the uncompounded component image is a component image at a zero steering angle.

12. A device for spatial compound imaging, comprising, a memory, for storing component images and compounded images generated from the component images;
    a buffer configured to acquire and buffer a component image $C(i, j)$ of a current steering scan cycle i and a steering angle j wherein a steering scan cycle comprises capturing a respective component image at each of a plurality of steering angles;
    a differential image computing unit configured to subtract a component image $C(i-1,j)$ of a previous scan cycle i-1 from the component image $C(i, j)$ of the current scan cycle i to obtain a differential image $D(i,j)$, wherein the component images $C(i,j)$ and $C(i-1,j)$ are of the same steering angle;
    a pre-processing unit configured to pre-process said differential image $D(i,j)$;
    a compounding unit configured to compound the pre-processed differential image $D(i,j)$ of the current scan cycle i and a compounded image $Co(i-1,j)$ of a previous scan cycle i-1 to form a compounded image $Co(i,j)$ of the current scan cycle.

13. The device of claim 12, wherein the component image $C(i-1, j)$ in the memory is updated with the component image $C(i, j)$ and the compounded image of the previous scan cycle $Co(i-1,j)$ is updated with the compounded image $Co(i,j)$ in the memory.

14. The device of claim 13, wherein the pre-processing unit comprises:
    a re-sampler configured to re-sample said differential image $D(i,j)$ such that the re-sampled differential image $D(i,j)$ and the compounded image $Co(i-1,j)$ of the previous scan cycle are in a same coordinate system.

15. The device of claim 14, wherein the re-sampling comprises one of linear interpolation and non-linear interpolation.

16. The device of claim 15, wherein the pre-processing unit further comprises:
    a first weighting unit configured to weight the differential image $D(i,j)$ based on the steering angle j and a scan depth of the image.

17. The device of claim 16, wherein the pre-processing unit further comprises:
    a second weighting unit configured to weight scanlines of the differential image $D(i,j)$ such that the scanlines of the weighted differential image D(i,j), which are closer to a boundary, have smaller amplitudes.

18. The device of claim 17, further comprises:
a post-processing unit configured to normalize the compounded image Co(i,j) so as to eliminate an amplitude difference of different regions of the compounded image Co(i,j) caused by the compounding unit.

19. The device of claim 12, further comprises:
a motion detecting unit configured to determine if the compounded image Co(i,j) comprises a motion blur according to the amplitude of the differential image D(i,j),
an output controller configured to determine if a heavy motion blur is contained and outputting an uncompounded component image for display if the amplitude of the differential image D(i,j) is larger than a first threshold value; otherwise
determining no motion blur is contained and outputting the compounded image Co(i,j) if the amplitude of the differential image is smaller than a second threshold value.

20. The device of claim 19, wherein the amplitude of the differential image D(i,j) is a summation of absolute values of the differential image D(i,j).

21. The device of claim 19, wherein the first threshold value is equal to the second threshold value.

22. A method for use in an ultrasonic scanning system, comprising:
a) receiving a component image C(i,j) of a current steering scan cycle i and a steering angle j, wherein a steering scan cycle comprises capturing a respective component image at each of a plurality of steering angles;
b) using a processor to obtain a differential image D(i,j) by subtracting a component image C(i−1,j) of a previous scan cycle i−1 from the component image C(i,j) of the current scan cycle i, wherein the component images C(i,j) and C(i−1,j) are of the same steering angle j;
c) determining if a motion blur is contained in the differential image D(i,j) according to the amplitude of the differential image, wherein
if the amplitude of the differential image D(i,j) is larger than a first threshold value, then outputting an uncompounded component image for display; otherwise
pre-processing the differential image D(i,j) if the amplitude of the differential image is smaller than a second threshold value;
compounding the pre-processed differential image D(i,j) of the current scan cycle i and a compounded image Co(i−1,j) of a previous scan cycle i−1 to form a compounded image Co(i,j) of the current scan cycle i and outputting the new compounded Co(i,j) image for display.

23. An ultrasonic diagnostic imaging system, comprising:
a probe configured to transmit and receive ultrasonic beams; and
a processor configured to control the probe to transmit ultrasonic beams at different angles, receive echoes as component images, and perform spatial compounding on the received component images, wherein the processor is further configured to:
a) receive a component image C(i,j) of a current steering scan cycle i and a steering angle j, wherein a steering scan cycle comprises capturing a respective component image at each of a plurality of steering angles;
b) obtain a differential image D(i,j) by subtracting a component image C(i−1,j) of a previous scan cycle i−1 from the component image C(i,j) of the current scan cycle i, wherein the component images C(i,j) and C(i−1,j) are of the same steering angle j;
c) pre-process said differential image D(i,j) and compound the pre-processed differential image D(i,j) of the current scan cycle i and a compounded image Co(i−1,j) of a previous scan cycle i−1 to form a compounded image Co(i,j) of the current scan cycle i; and
d) output an uncompounded component image for display if an amplitude of the differential image is larger than a first threshold value, and to output the compounded image frame if the amplitude of the differential image is smaller than a second threshold value.

24. An ultrasonic imaging diagnostic system, comprising:
a probe;
a transmitting beamformer;
a receiving beamformer;
a compounding image controller configured to control the transmitting beamformer and the receiving beamformer;
an envelope detecting unit configured to extract an envelope characteristics of a received beam from the receiving beamformer to output a component image C(i, j) of a current scan cycle i and a steering angle j, wherein a steering scan cycle comprises capturing a respective component image at each of a plurality of steering angles;
an image compounding unit configured to spatially compound the component images;
a digital scan convertor (DSC) configured to digitally convert the spatially compounded image and outputting the spatially compounded image for display;
characterized in that the image compounding unit further includes: a buffer for buffering the component image,
a memory, for storing component images and a compounded image generated from the component images;
a differential image computing unit configured to subtract a component image C(i−1,j) of a previous scan cycle i−1 from the acquired component image C(i, j) of the current scan cycle I to obtain a differential image D(i,j), wherein the component images C(i−1,j) and C(i,j) are of the same steering angle j;
a pre-processing unit configured to pre-process said differential image D(i,j);
a compounding unit configured to compound the pre-processed differential image D(i,j) and a previous compounded image Co(i−1,j) of a previous scan cycle i−1 to form a compounded image Co(i,j) of the current scan cycle i; and
a controller configured to perform the following control according to the amplitude of the differential image:
outputting an uncompounded component image for display if the amplitude of the differential image is larger than a first threshold value; otherwise
outputting the compounded image for display if the amplitude of the differential image is smaller than a second threshold value.

* * * * *